United States Patent
Causte et al.

(10) Patent No.: US 8,119,948 B2
(45) Date of Patent: Feb. 21, 2012

(54) METHOD OF RETOUCHING METAL PARTS

(75) Inventors: Eric Yves Roger Causte, Nemours (FR); Thierry Jean Emile Flesch, Pringy (FR); Mathieu Gueguen, Paris (FR); James Prodent, Oncy sur Ecole (FR)

(73) Assignee: SNECMA, Paris (FR)

( * ) Notice: Subject to any disclaimer, the term of this patent is extended or adjusted under 35 U.S.C. 154(b) by 714 days.

(21) Appl. No.: 12/245,131

(22) Filed: Oct. 3, 2008

(65) Prior Publication Data

US 2009/0090701 A1 Apr. 9, 2009

(30) Foreign Application Priority Data

Oct. 5, 2007 (FR) ...................................... 07 07011

(51) Int. Cl.
*B23K 26/00* (2006.01)

(52) U.S. Cl. ......... 219/121.64; 219/121.66; 219/121.63; 219/121.65

(58) Field of Classification Search ............. 219/121.64, 219/121.66, 121.63, 121.65, 121.84, 121.85; 148/525
See application file for complete search history.

(56) References Cited

U.S. PATENT DOCUMENTS

| | | | | |
|---|---|---|---|---|
| 5,109,604 A | * | 5/1992 | Koebele | 29/889.5 |
| 5,846,057 A | * | 12/1998 | Ferrigno et al. | 416/241 R |
| 5,889,254 A | * | 3/1999 | Jones | 219/121.63 |
| 6,900,410 B2 | * | 5/2005 | Tsukamoto et al. | 219/121.62 |
| 6,972,390 B2 | * | 12/2005 | Hu et al. | 219/121.64 |
| 6,998,568 B2 | * | 2/2006 | Brehm et al. | 219/121.62 |
| 7,051,435 B1 | * | 5/2006 | Subramanian et al. | 29/889.1 |
| 2007/0023403 A1 | * | 2/2007 | Emiljanow | 219/121.64 |
| 2008/0029500 A1 | * | 2/2008 | Malley et al. | 219/121.85 |
| 2010/0000976 A1 | * | 1/2010 | Ott et al. | 219/121.17 |

FOREIGN PATENT DOCUMENTS

| | | |
|---|---|---|
| EP | 1 424 158 A1 | 6/2004 |
| EP | 1 894 658 A1 | 3/2008 |
| WO | WO 2005/030429 A2 | 4/2005 |
| WO | WO 2007012338 A1 * | 2/2007 |

* cited by examiner

*Primary Examiner* — M. Alexandra Elve
(74) *Attorney, Agent, or Firm* — Oblon, Spivak, McClelland, Maier & Neustadt, L.L.P.

(57) ABSTRACT

A method of retouching metal parts joined by brazing at high temperatures is disclosed. The brazed zones are retouched by a retouching laser. The peak power of the retouching laser is between 1500 and 3000 W. The retouching laser is used in pulsed mode.

13 Claims, 2 Drawing Sheets

METHOD OF RETOUCHING METAL PARTS

BACKGROUND OF THE INVENTION

1. Field of the Invention

The invention relates to the brazing of metal parts and, more particularly, the retouching of brazed joints.

2. Description of Related Art

Brazing involves solidly linking two metal parts in a surface contact position by means of a filler metal that is heated, the filler metal having a melting temperature lower than those of the parts to be joined.

When linking two metal parts by brazing in an oven, defects can appear in the parts. It is then necessary to "repeat" the brazing; that is, to retouch the brazing defects. "Repeating" the brazing consists in melting the brazed joint and filling the material voids with the filler metal used for the initial braze.

However, a second oven brazing cycle includes a certain number of risks. Often to be observed are a geometrical deformation of the assembly, a degradation of the intrinsic properties of the materials or even the appearance of new defects resulting, where appropriate, in the assembly being scrapped.

With regard more particularly to the brazing of aeronautical parts, repeated passes through the high temperature oven reduce the life span of the parts.

Moreover, the same ovens are used in brazing and in repeating the braze, which reduces the rate of production of the assemblies. Since the heating oven is used only for batches of parts, it is necessary to wait to have a sufficient number of defective parts before being able to make the repairs, which accordingly extends the production cycles.

Also known is the retouching of the defects by arc (TIG) welding. However, this type of high-power heating can lead to deformations that cannot be repaired, and the assembly must then be scrapped.

BRIEF DESCRIPTION OF THE INVENTION

In order to overcome these defects, the applicant proposes a method of retouching metal parts joined by brazing at high temperatures, wherein the brazed zones are retouched by means of a retouching laser, the peak power of the retouching laser being between 1500 and 3000 W, the retouching laser being used in pulsed mode.

The repair of metal parts by means of a retouching laser makes it possible to locally limit the thermally affected zone (TAZ) of the part. This type of laser is conventionally used for welding operations, in particular in the field of jewelry for very small parts, or for recharging molds.

Such a laser makes it possible to perform retouches with parts brazed at high temperatures.

Unlike the laser welding which requires high energy, the laser retouching of brazed joints is performed at low power with localized application of energy.

The use of the laser in pulsed mode advantageously makes it possible to limit the deformations of the part and, in the case of high pressure compressor straighteners, not to affect the geometry of the blade. Furthermore, the energy consumption of the laser in pulsed mode is considerably lower compared to continuous mode operation.

The retouching of the brazed zones is performed with or without filler metal deposited on the brazed zones.

The filler metal, in contact with the retouching laser beam, melts on the brazed zone in order to fill the brazing defects of the part, the filler metal taking the form of powder, paste or wire. The filler metal is chosen to be compatible with the filler metal used for the initial brazing.

Preferably, the low-power retouching laser is used in pulsed mode, the rise time of the laser pulse being less than its fall time for nickel or cobalt-based metal parts.

Preferably, the assembled metal parts are protected against oxidation by means of a device for gaseous protection against oxidation.

BRIEF DESCRIPTION OF THE SEVERAL VIEWS OF THE DRAWINGS

Other characteristics and advantages will become apparent from the description that follows of the inventive method with reference to the figures in which.

DETAILED DESCRIPTION OF THE INVENTION

Figure 1:
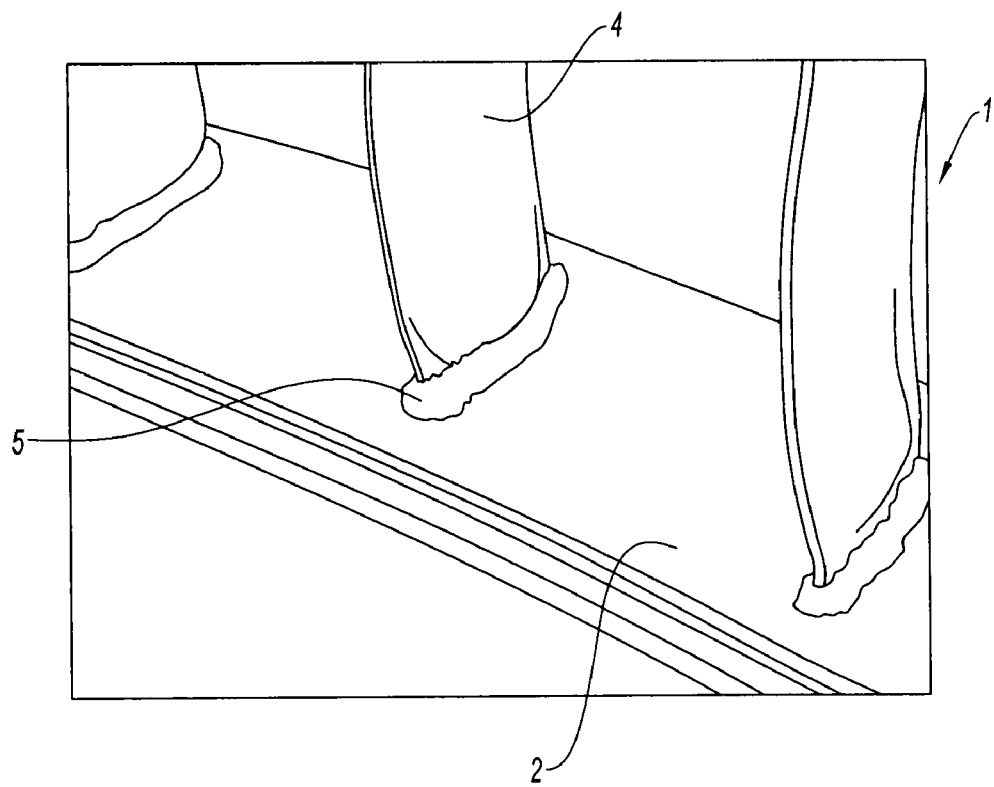
FIG. 1 is a snapshot of a portion of a sector of a high-pressure (HP) compressor straightener in which can be seen a brazed zone to be retouched between a straightener blade and an internal crown gear.
Figure 2:
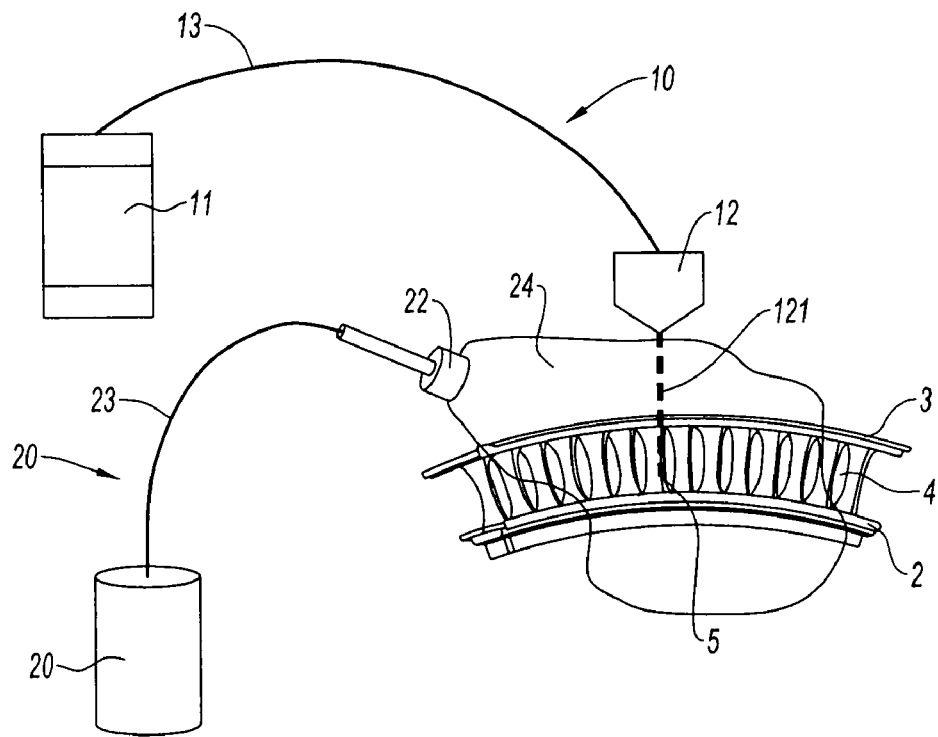
FIG. 2 diagrammatically represents the method of retouching the brazed zone of FIG. 1 with a low-power retouching laser.

Referring to FIG. 1, a sector of turbomotor HP compressor straightener 1 comprises straightener blades 4 fixed between an internal crown gear 2 and an external crown gear 3 (see FIG. 2). The straightener blades 4 are linked to the crown gears 2, 3 in a brazing operation. Referring to FIG. 1, a material defect 5 is apparent in the brazed zone at the interface between the blade 4 and the crown gear 2. Such a defect causes the aerodynamic properties of the blade 4 to be modified and the assembly presents a high risk of breaking. The repair of the braze is therefore needed.

Referring to FIG. 2, the defective braze 5 is retouched to eliminate therefrom the voids and imperfections by means of a correction or retouching laser 10 of the Nd-YAG type, comprising an emission head 12 linked by an optical fiber 13 to a laser source 11. Such a fiber makes it possible to easily manipulate the emission head 12 relative to the laser source 11.

The laser emission head 12 is manually positioned above the defect 5 so that the laser beam 13, from the emission head 12, melts the braze and causes the defect 5 to disappear.

To fill the lack of material, the braze retouching is here performed with the addition of a metal, not represented, taking the form of a wire, the diameter of which is between 0.3 mm and 0.8 mm, and which is positioned over the defect 5 to be melted when the retouching laser 10 passes. It goes without saying that a filler metal in the form of a powder, a paste and even as a sintered preform would also be appropriate. This second filler metal is not necessarily the same as that used for the initial braze, a filler metal compatible with the initial metal is sufficient.

Thus, for an initial braze performed with a filler metal based on nickel/chrome, nickel/palladium or precious metals, it is possible to use a second filler metal in the form of gold/nickel (Au—Ni) wire or nickel-based wire.

Before each retouching operation, the part must be cleaned and degreased in order to avoid any pollution of the braze and the introduction of defects.

The retouching laser 10 is here controlled semi-manually, a robot or a Cartesian machine guiding the laser emission head 12 remotely from the user while the latter manipulates the filler metal. It goes without saying that a manual or entirely automated manipulation could also be appropriate.

Figure 3:
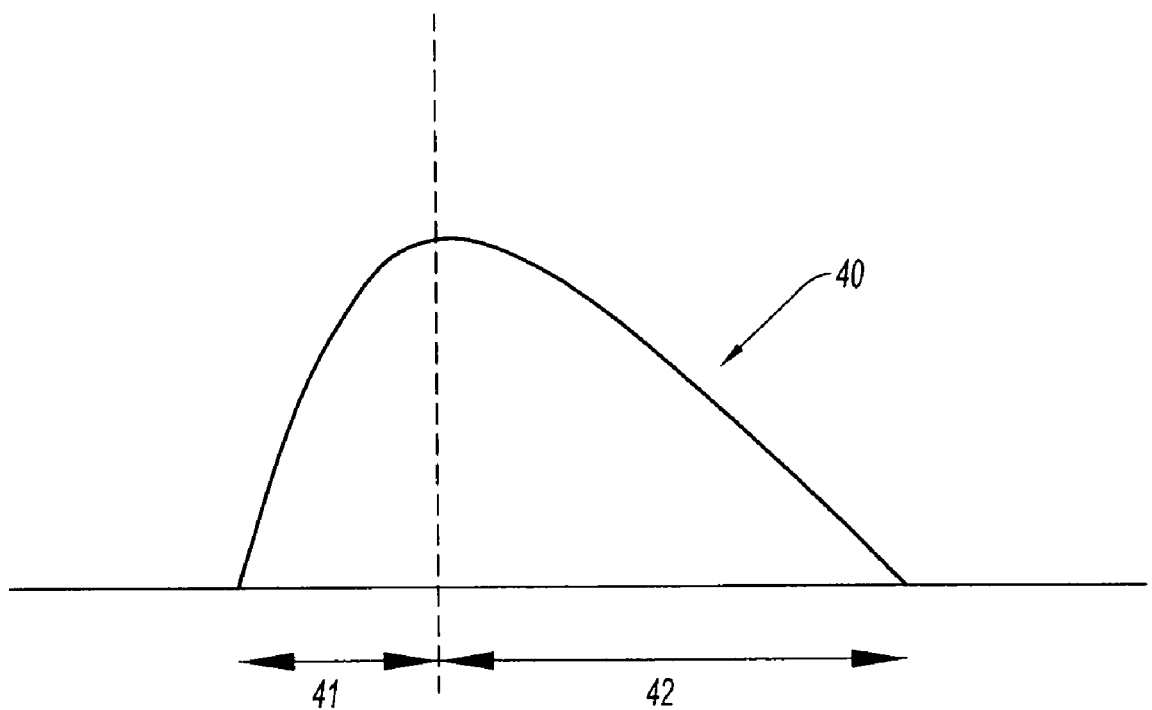
FIG. 3 represents the pulse shape of the signal emitted by the low-power retouching laser of FIG. 2.

The laser is used at low power and for a frequency range between 4 and 8 Hz, thus limiting the heating of the part. Referring to FIG. 3, the laser 10 is used in pulsed mode and transmits laser pulses 40 at regular intervals having a peak power of between 1500 W and 3000 W. The pulses 40 are not symmetrical, the power rise time of the laser 41 being less than the power fall time 42. The power rise time 41 is here 2-5 ms and the power fall time 42 is 10-12 ms, the overall pulse time being between 5 and 15 ms.

A rapid rise 41 and a slow fall 42 make it possible to limit the thermal gradients in the part, a high temperature difference between two close zones increasing the risk of cracks. This type of pulse 40 is particularly suited to nickel-based brazing, which is fragile and for which the stresses must be relaxed.

However, it goes without saying that the shape of the signal can be adapted for other alloys. Thus, for an alloy of NC22FeD type based on nickel, a pulse with a slow rise and a fast fall would be more appropriate. To avoid the appearance of cracks, preference is given to the duration of the laser pulse at the pulse peak power.

The laser is used in an oxidation-protection atmosphere 24 maintained by a device for gaseous protection against oxidation 20. The antioxidizing gas is piped from a gas source 21 to a diffusion nozzle 22 via a gas pipe 23.

The protection atmosphere 24 surrounds the braze repair zone in order to prevent the oxidation of the part when performing the retouching, an oxidation leading to a reduction in the life cycle of the part. A diffusion nozzle 22 is used here that has a large diameter, between 20 and 30 mm, like those used in the TIG arc welding methods. Such nozzles allow a fluid flow over a relatively wide zone by comparison to the protection nozzles used conventionally for laser welding.

The invention claimed is:

1. A method of retouching metal parts comprising:
   joining straightening blades with an internal crown gear and an external crown gear by brazing at high temperatures;
   identifying a defect in a brazed zone between one of the blades and one of the crown gears;
   cleaning and degreasing the defect in the brazed zone; and
   retouching the defect in the brazed zone using a retouching laser at low power in pulsed mode such that the laser transmits laser pulses at regular intervals,
   wherein the peak power of the retouching laser is between 1500 and 3000 W, and
   wherein the pulses are not symmetrical such that a power rise time of the laser pulse is different than a power fall time of the laser pulse.

2. The method as claimed in claim 1, wherein the retouching of the brazed zones is performed with a filler metal deposited on the brazed zones.

3. The method as claimed in claim 2, wherein the filler metal takes the form of powder, paste, wire or sintered preform.

4. The method as claimed in claim 2, wherein the filler metal is compatible with the filler metal used in the initial brazing of the metal parts.

5. The method as claimed in claim 1, wherein the retouching laser is controlled semi-manually.

6. The method as claimed in claim 1, wherein the metal parts are made of nickel or cobalt-based alloy.

7. The method as claimed in claim 1, wherein the power rise time of the laser pulse is less than the power fall time of the laser pulse.

8. The method as claimed in claim 1, wherein the metal parts have been joined by oven brazing.

9. The method as claimed in claim 1, wherein the pulse time of the retouching laser is between 5 and 15 ms.

10. The method as claimed in claim 7, wherein the pulse time of the retouching laser is between 5 and 15 ms.

11. The method as claimed in claim 1, wherein the frequency of the retouching laser is between 4 and 8 Hz.

12. The method as claimed in claim 1, wherein the brazed metal parts are protected against oxidation by means of a device for gaseous protection against oxidation.

13. The method as claimed in claim 1, wherein the power rise time of the laser pulse is greater than the power fall time of the laser pulse.

* * * * *